United States Patent
Bess et al.

(10) Patent No.: US 6,877,136 B2
(45) Date of Patent: Apr. 5, 2005

(54) SYSTEM AND METHOD OF PROVIDING ELECTRONIC ACCESS TO ONE OR MORE DOCUMENTS

(75) Inventors: Dwayne Lamarr Bess, San Antonio, TX (US); Harold Allan Brischke, San Antonio, TX (US); Andrew Charles Keller, LaCoste, TX (US); Dale Alan Wagner-Krankel, San Antonio, TX (US); Jacob Garza Tijerina, San Antonio, TX (US); Billy Ray Connolly, Jr., Converse, TX (US); Karen Ann O'Connor, San Antonio, TX (US); James William McDaniel, San Antonio, TX (US); Rodney Ray Lewis, San Antonio, TX (US); Rita Maria Young, San Antonio, TX (US); George Edward Joy, Boerne, TX (US); Curt Wayne Moy, San Antonio, TX (US); Susan Yonker Price, San Antonio, TX (US); John Robinson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 166 days.

(21) Appl. No.: 10/280,764

(22) Filed: Oct. 25, 2002

(65) Prior Publication Data

US 2003/0105759 A1 Jun. 5, 2003

(Under 37 CFR 1.47)

Related U.S. Application Data

(60) Provisional application No. 60/339,345, filed on Oct. 26, 2001.

(51) Int. Cl.[7] .............................................. G06F 17/00
(52) U.S. Cl. ...................................... 715/501.1; 707/10
(58) Field of Search .............................. 715/501, 501.1; 707/9, 10; 713/201

(56) References Cited

U.S. PATENT DOCUMENTS

| | | | | |
|---|---|---|---|---|
| 5,713,019 A | * | 1/1998 | Keaten | 707/10 |
| 6,334,130 B1 | * | 12/2001 | Tada et al. | 707/9 |
| 6,357,010 B1 | * | 3/2002 | Viets et al. | 713/201 |
| 6,381,602 B1 | * | 4/2002 | Shoroff et al. | 707/9 |
| 6,640,307 B2 | * | 10/2003 | Viets et al. | 713/201 |
| 6,647,388 B2 | * | 11/2003 | Numao et al. | 707/9 |

* cited by examiner

Primary Examiner—Sanjiv Shah
(74) Attorney, Agent, or Firm—Jackson Walker L.L.P.; Richard R. Ruble; Ziad N. Zarka

(57) ABSTRACT

The present invention provides a system and method of providing electronic access to one or more documents. In one embodiment, a storage device retains eligibility information relating to each document. Eligibility information provides the system with information such as the document type, the applicable line of business, governmental regulations, time sensitive information, and security requirements. If a given document is determined to be eligible, the processing unit of the present invention retrieves one or more preference instructions provided by the customer. The preference instructions are reviewed to confirm 1) whether the customer has authorized electronic access to a given document and 2) the mode of electronic transmission favored by the customer. In one embodiment, the present invention is connected to a computer network such that the customer may be provided electronic access to his or her documents through a web interface.

26 Claims, 4 Drawing Sheets

SYSTEM AND METHOD OF PROVIDING ELECTRONIC ACCESS TO ONE OR MORE DOCUMENTS

This utility application claims priority upon a provisional patent application entitled "ELECTRONIC DOCUMENT DELIVERY", Ser. No. 60/339,345, having a filing date of Oct. 26, 2001.

FIELD OF THE INVENTION

The present invention relates generally to a document manipulation system and, more particularly, to a system and method of providing electronic access to one or more documents.

BACKGROUND OF THE INVENTION

As computers have become indispensable in our day-to-day activities, the advantages of storing information electronically have steadily increased. One of the primary advantages of electronically stored information is its inherent versatility. For example, editing and exchanging electronic information is greatly simplified as compared to editing and exchanging documents stored in paper form only. Furthermore, any advantage attributable to having a physical document is retained in electronic storage because a "hard copy" of an electronic document may be readily produced from the electronic version.

Another significant advantage of electronically stored documents is that of providing enhanced access to information. Over the past few years, the improved access offered by electronic documents has become so important that many organizations expend substantial resources in scanning paper documents to store them electronically.

Routine facsimile transmission further exemplifies the value of electronic access to documents. Arguably, it is access to information that fuels what many refer to as the Information Age.

Today, perhaps the most prominent example of access to electronically stored information is the Internet. Literally millions of people depend on the Internet for email, banking, investing, shopping, news, entertainment, and social interaction. Not too many years ago, sharing information over the Internet was principally the domain of academicians and scientists. For members of the general public, the technical nature of Internet access tools and the prohibitive computer hardware requirements meant virtual anonymity for the Internet. However, the advent of hypertext navigation and the World Wide Web ("Web"), in conjunction with modestly priced and increasingly powerful personal computers, has propelled the Internet to the forefront of public attention and has made the Internet an indispensable source of information.

Unfortunately, providing electronic access to documents is not always a straightforward process. Governmental regulations, increased security concerns and customer preferences, to name a few, play a major role in determining what documents may be disseminated electronically.

Thus, there remains a need for a system and method of providing electronic access to one or more documents capable of determining which documents are eligible for electronic access and providing such documents in a manner consistent with the individual preferences of the consumer.

SUMMARY OF THE INVENTION

Accordingly, the present invention provides a system and method of providing electronic access to one or more documents. The present invention provides a processing unit coupled to one or more storage devices capable of retaining electronic data.

Documents for which electronic access is desirable are examined to determine eligibility. In one embodiment, the storage device of the present invention retains eligibility information relating to each document. Eligibility information provides the system with information such as the document type, the applicable line of business, governmental regulations, time sensitive information, and security requirements.

The present invention allows this information to be searched for any given document to determine whether the document may be accessed electronically. If a given document is determined to be eligible, the processing unit of the present invention retrieves one or more preference instructions provided by the customer. In one embodiment, preference instructions are stored upon a storage device coupled to the processing unit of the present invention. The preference instructions are reviewed to confirm 1) whether the customer has authorized electronic access to a given document and 2) the mode of electronic transmission favored by the customer.

In one embodiment, the present invention is connected to a computer network. Thus, the customer may access documents electronically through a web interface provided over a computer network. In one embodiment of the present invention, the customer is notified when a document has been provided for electronic access. Thus, the customer is kept informed of the status of his or her documents.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention is herein described as a method of providing electronic access to one or more documents and as a computer system for providing electronic access to one or more documents.

Figure 1:
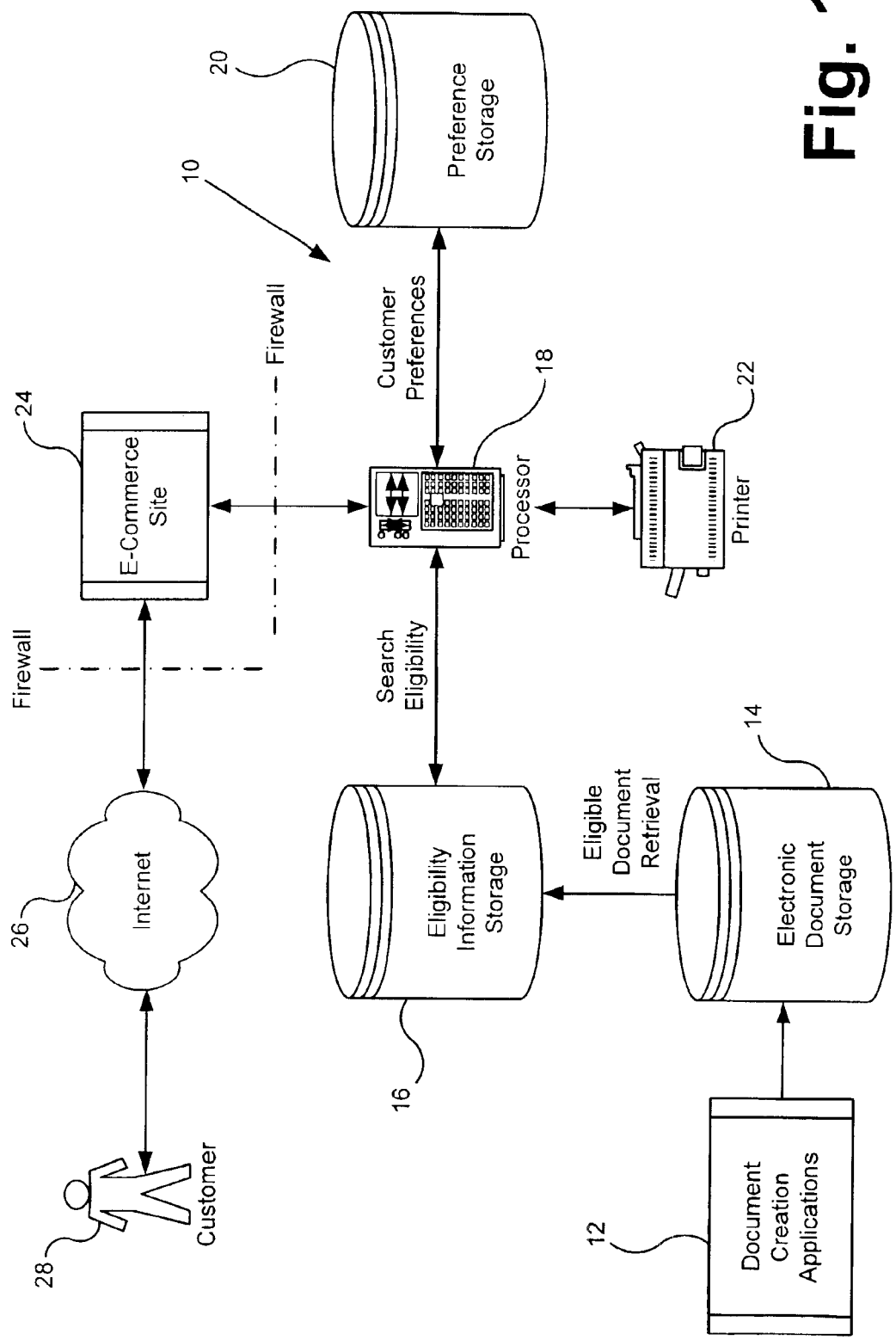
FIG. 1 is a component diagram of one embodiment of the present invention.

Referring to FIG. 1, the computer system (10) of the present invention provides one or more document applications (12) capable of creating electronic documents. A number of known document creation systems working in conjunction with an acceptable platform (not shown) may be utilized to create electronic documents for use by the present invention. In one embodiment, a document creation application designed by IBM® is utilized.

Documents may be created "from scratch" or scanned and transformed into electronic format from hard copy documents. Regardless of the origination of the electronic document, each document is stored upon a document storage (14) for later use.

To accomplish this, the present invention provides a storage device (16) capable of storing and maintaining electronic data. In one embodiment, the storage device (16) is populated with eligibility information relating to each electronic document held upon the document storage (14). Specifically, the eligibility information provides specific guidelines for determining which documents may be provided electronically.

The present invention provides a processing unit (18) for searching eligibility information held upon the storage device (16) and determining which electronic documents are eligible for electronic access. The processing unit of the present invention is electronically coupled to the eligibility information storage device (16) and document storage (14) such that information may pass therebetween.

In one embodiment, the eligibility information held upon the storage device (16) may be divided into one or more categories. First, the content of each document may be utilized to determine eligibility. Various document types including, but not limited to, notices, warnings, solicitations, invoices and incentives, may have specific requirements that must be adhered to prior to providing access to the recipient. Second, the line of business at issue, i.e., financial transactions, insurance, etc., may have relevant industry standards applicable to the question of electronic access.

Third, document eligibility may be affected by security requirements. To illustrate, if electronic access over a computer network is desirable, the recipient must furnish the proper password or other minimum security threshold to gain access. If he or she fails to do so, the document will be ineligible for electronic access.

In one embodiment of the present invention, a fourth category of eligibility information comprises one or more legal requirements. Each document may be subject to legal or regulatory requirements affecting how a document may be presented to a recipient. For example, some states' insurance liability cards are required to be printed on a specific type of bond paper. This legal requirement allows inspecting police officers to immediately determine the authenticity of an individual's insurance card. Unfortunately, this regulatory requirement also prohibits the presentation of these insurance cards to a recipient via electronic means.

A fifth category of eligibility information comprises time sensitive information. The relevant age of an electronic document may be important to determining whether electronic access is available. For example, many documents are time sensitive and must be updated with new information periodically. Thus, in one embodiment, "stale" documents not updated with current information may be ineligible for electronic access.

Finally, documents may be categorized according to privacy constraints. Certain documents may not be shared with third parties without the consent of the individual to whom the document pertains, e.g., medical records. Thus, electronic access to one or more electronic documents may be denied in lieu of privacy concerns or due to lack of the required consent.

Figure 2:
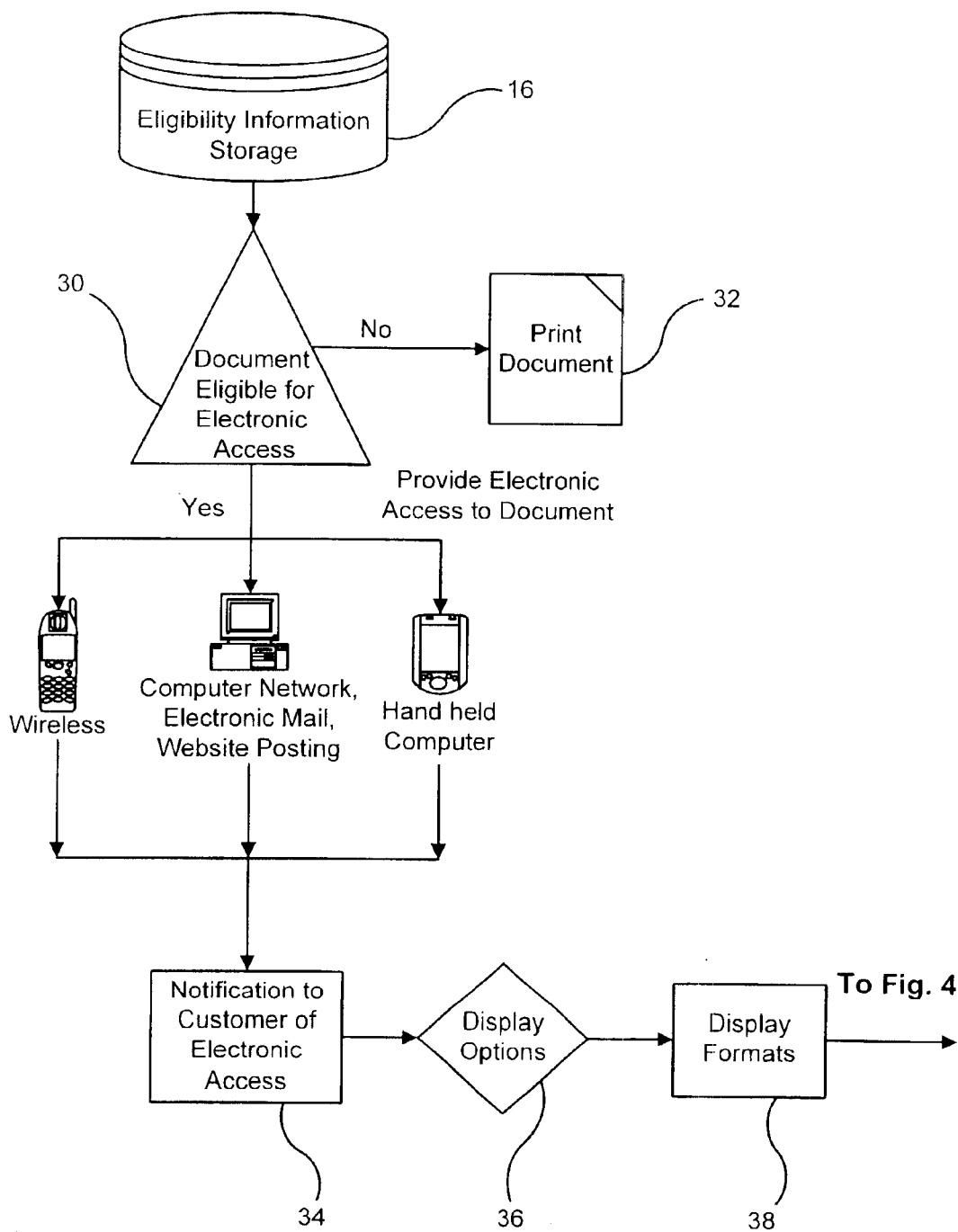
FIG. 2 is a process flow diagram illustrating the electronic access process of one embodiment of the present invention.
Figure 3:
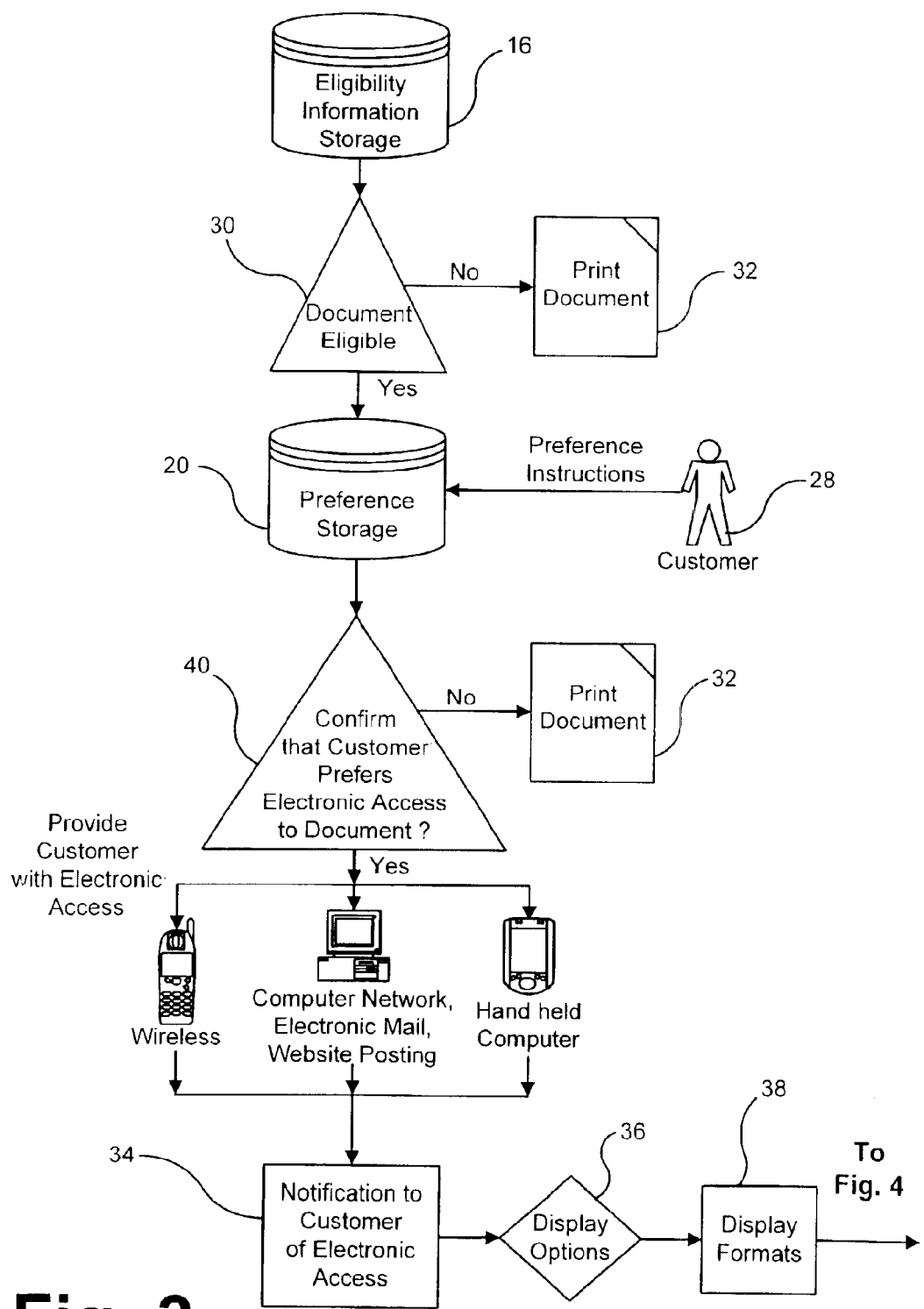
FIG. 3 is a process flow diagram illustrating the electronic access process of one embodiment of the present invention utilizing customer preferences.

Referring to FIGS. 1, 2, and 3, in one embodiment of the present invention, a user (28) may access the e-commerce site (24) of the present invention such that he or she may electronically communicate with the processing unit (18). Once the user's identity is confirmed, the processing unit of the present invention determines which documents stored upon the document storage (14) may be accessible to the user (28). Once the identity of such documents has been determined, the eligibility for electronic access of each document is determined, as illustrated by Box (30). In one embodiment, this is accomplished by searching the eligibility information pertaining to the documents stored upon the storage device (16).

For example, Document "A" is described as a financial services invoice accessible only by an individual possessing a six-digit password. This document may, in turn, also be regulated by governmental regulation "B," which requires such an invoice to be provided to said individual on bond paper utilizing 12-point font and 1" margins.

In short, each document to which electronic access is desirable may not be eligible. In the above example, Document "A" would not be eligible for electronic access due to the legal requirement of bond paper printing. In one embodiment, the system (10) is capable of printing a hard copy (32) of ineligible documents via a printer (22) electronically coupled to the processing unit (18) of the present invention.

The system is capable of providing the user (28) with electronic access to various documents determined to be eligible. In one embodiment, document content, line of business, security requirements, legal requirements, time sensitivity, and privacy concerns are searched and reviewed in combination to determine document eligibility. In one embodiment, the processing unit of the present invention is electronically coupled to a second storage device (20) designed to store and maintain electronic data relating to each user (28). The system, through a computer network (26) or other communication medium, is capable of receiving customer preferences relating to one or more documents and storing same upon the storage device (20).

In one embodiment, once eligibility of an electronic document is determined, the processing unit (18) of the present invention searches preference storage (20) for preferences relating to the user (28) and the document(s) at issue. In this embodiment of the present invention, customer preferences for each eligible document are searched and confirmed prior to providing electronic access, as illustrated by Box (40).

In one embodiment, preference information and eligibility information may be stored upon a single storage device (not shown). In this manner, eligibility information and customer preferences may be merged into a single electronic data file for convenient searching and retrieval by the processing unit (18).

Electronic access may be provided to the user through a plurality of communication mediums including, but not limited to, a computer network, electronic mail transmission, wireless transmission, satellite transmission, hand-held computer, and facsimile transmission. In one embodiment, the system (10) provides the user (28) with at least one notification indicating that electronic access has been provided, as illustrated by Box (34).

This notification may be transmitted to the user through any known communication medium. In one embodiment, the user (28) is provided an email message notifying him or her that one or more documents has been provided for electronic access. A single notification may provide the user with information pertaining to a plurality of electronic documents. This feature of the present invention ensures that the user (28) does not experience excessive correspondence or "spam" from the document provider.

In one embodiment, the user (28) may gain access to eligible documents by accessing a website (24) and entering a password code. Documents may then be viewed and/or downloaded at the user's convenience. One embodiment of the present invention provides the user with a list of display options for each document, as illustrated by Box (36).

In one embodiment, one of the display options includes a custom summary of one or more documents. This feature of the present invention provides the user with a concise yet informative view of the document with the option to view the entire document at a later time. Further, the present invention allows the user to view the document in non-image type format or image-type format as illustrated by Box (38). To illustrate, electronic documents in non-image type format, such as HTML, may be amended and/or equipped with additional functionality. Further, image type format, often referred to as document type format, may be coded to allow for amendment or additional functionality, if desired.

In one embodiment, electronic documents may contain one or more data links capable of directing the user (28) to other internet addresses or additional functionality. In one embodiment, data links are designed to direct the user to transactional information such as online payment options. The feature of the present invention allows the user not only to review the electronic documents but also to transact business online in a convenient and efficient manner.

In contrast to non-image type format, image type format generally does not contain functionality and does not allow for easy revision. Several examples of image type format include portable document format (PDF), JPG, GIF, Tiff, Bitmap and portable network graphic (PNG). Thus, if the user wishes to print, download, or save a document having an appearance substantially identical to a corresponding hard copy version, if any, the user is given the option to do so via image type formatting.

The electronic documents of the present invention may be equipped with electronic e-signature capability. Specifically, electronic documents in the information age are frequently used to transact business over the internet or other communication media. As a result, electronic documents of the present invention may be populated with transactional information. For such documents, the user need only review and "sign" the pre-populated document to conduct an electronic transaction with the document provider or, in some instances, a third party. In this way, the present invention allows the user to review and utilize electronic documents to transact business, if desired.

Figure 4:
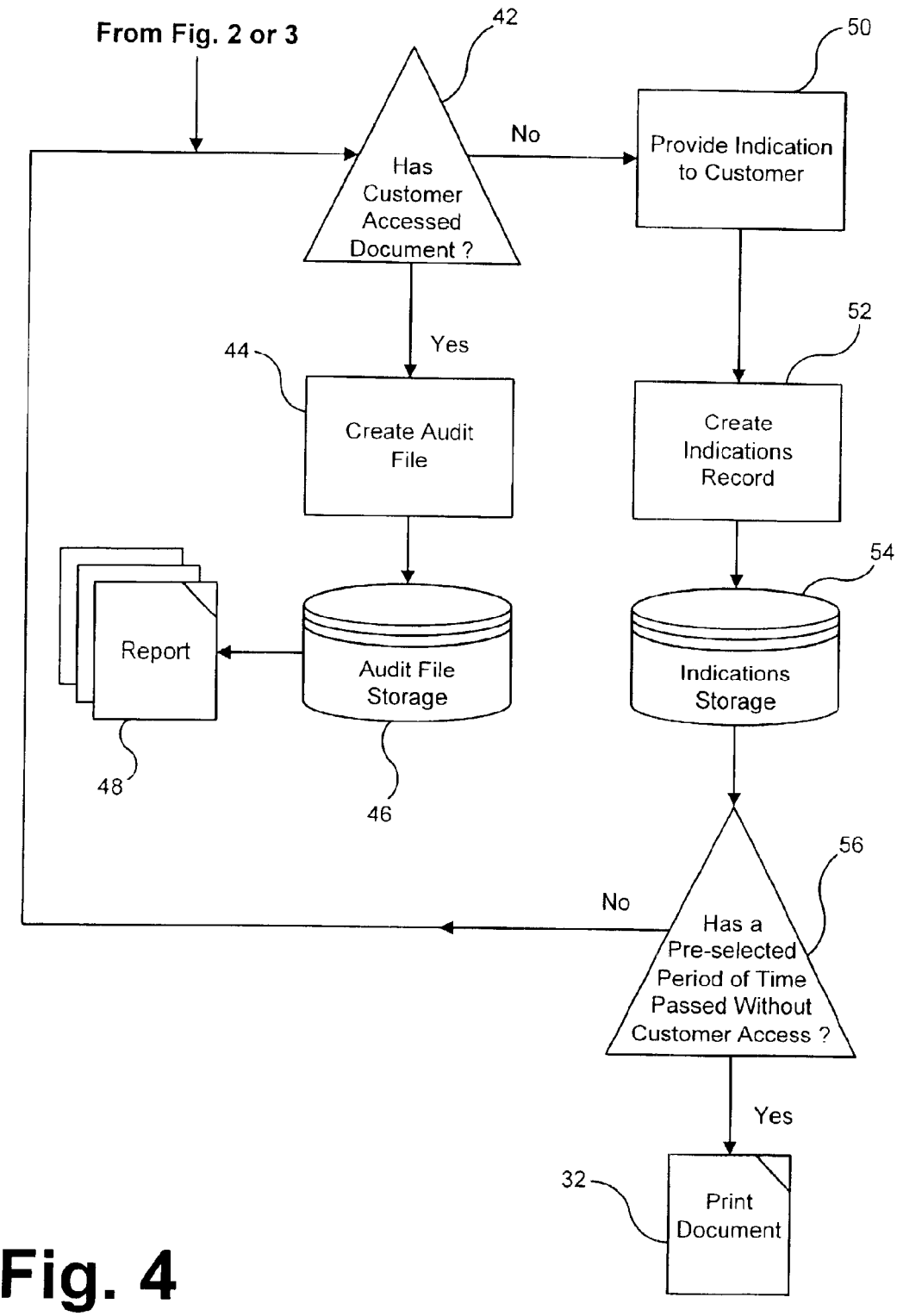
FIG. 4 is a process flow diagram illustrating an audit process of one embodiment of the present invention.

Referring to FIG. 4, the present invention is capable of determining whether document(s) provided electronically, have been accessed by the user (28). When the user accesses a document electronically, preferably through a website or other communication media, the processing unit creates one or more audit files as illustrated by Boxes (42) and (44). The audit file contains information relevant to the time and manner by which the user accessed any given electronic document. The audit file is stored within a storage device (36) coupled to the processing unit (18) of the present invention, as illustrated by Box (46). Audit files created by the present invention may be utilized to create comprehensive reports for use by a document provider, customer service representatives, third parties, or the user, as illustrated by Box (48). It should be readily understood that the "user" need not be an external customer. Specifically, the document provider or any third party, subject to privacy and security requirements, may utilize the present invention to obtain and review electronic documents as desired.

In addition to creating and retaining audit records, the present invention is capable of providing the user with one or more indications illustrating which documents have been accessed electronically, as illustrated by Boxes (42), (50), and (52). In one embodiment, the present invention is capable of generating a reminder email for transmission to the user, signaling the printer (22) to provide a hard copy (32) to the user, or creating alert messages such as "you have unopened letters." This feature of the present invention may also be triggered if a pre-selected period of time has passed without customer review of one or more electronic documents, as illustrated by Box (56). Each indication may be stored upon a storage device for later use or further reminders, as illustrated by Box (54).

In one embodiment, the present invention provides a series of indications to the user via a graphic user interface. To illustrate, unopened documents may be highlighted with a red color while opened documents may be highlighted with a green color upon the website (24) utilized by the present invention, it being readily understood that any color scheme or color combination may be utilized by the present invention for this purpose. Further, unopened documents may be automatically displayed in a list or other arrangement above opened documents to encourage the user to open same. Alternatively, unopened documents may be displayed automatically at the bottom of the list or other arrangement relative to opened documents to encourage user interaction.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of providing electronic access to one or more documents comprising the steps of:
   providing a first storage device containing eligibility information for a plurality of said documents;
   searching said first storage device for said eligibility information pertaining to a first of said documents;
   utilizing said eligibility information, determining whether said first document is eligible for electronic access;
   if said first document is determined to be eligible, providing electronic access to said first document; and
   wherein said eligibility information is selected from the group consisting of content information, line of business information, security information, legal information, time sensitive information, and privacy information.

2. The method of claim 1, further comprising the additional step of:
   if said first document is not eligible for electronic access, printing a hard copy of said first document.

3. The method of claim 1, further comprising the additional steps of:
   receiving at least one preference instruction from a first customer requesting electronic access to one or more of said plurality of documents;
   storing said preference instruction upon a second storage device;
   searching said first customer's preference instruction held upon said second storage device relating to said first document; and
   utilizing said first customer's preference instruction, confirming that electronic access to said first document was requested by said first customer.

4. The method of claim 3, wherein said first storage device and said second storage device are the same storage device.

5. The method of claim 4, further comprising the additional step of:

providing at least one notification to said first customer indicating that electronic access to said first document has been provided.

6. The method of claim 3 or 4, further comprising the additional step of:

determining if said first customer has accessed said first document.

7. The method of claim 6, further comprising the additional step of:

if said first customer has not accessed said first document, providing one or more indications to said first customer that said first document has not been accessed.

8. The method of claim 7, further comprising the additional step of:

creating at least one record containing indication information relating to said first document.

9. The method of claim 7, further comprising the additional step of:

if said first customer has not accessed said first document within a pre-selected period of time after said indication is provided, providing a hard copy of said first document to said first customer.

10. The method of claim 1, further comprising the additional steps of:

creating an audit file containing activity information; and storing said audit file upon a third storage device.

11. The method of claim 10, further comprising the additional step of:

generating an activity report describing said activity information within said audit file.

12. The method of claim 1, further comprising the additional step of:

displaying one or more display options upon a website.

13. The method of claim 12, further comprising the additional step of:

displaying said first document upon said website in image type format or non-image type format.

14. The method of claim 12, further comprising the additional steps of:

creating one or more summaries of said first document; and displaying one or more of said summaries upon said website.

15. The method of claim 1, wherein said first document contains one or more data links.

16. The method of claim 15, wherein said data links provide said first customer with transaction information.

17. A computer system for providing electronic access to one or more documents comprising:

a first storage device containing eligibility information for a plurality of said documents;

a processing unit coupled to said first storage device, for searching said first storage device for said eligibility information pertaining to a first of said documents, determining whether said first document is eligible for electronic access utilizing said eligibility information, and providing electronic access to said first document if said first document is determined to be eligible; and wherein said eligibility information is selected from the group consisting of content information, line of business information, security information, legal information, time sensitive information, and privacy information.

18. The computer system of claim 17, wherein said processing unit is for receiving at least one preference instruction from a first customer requesting electronic access to one or more of said plurality of documents, storing said preference instruction upon a second storage device coupled to said processing unit, searching said first customer's preference instruction held upon said second storage device relating to said first document, and confirming that electronic access to said first document was requested by said first customer utilizing said first customer's preference instruction.

19. The computer system of claim 18, wherein said first storage device and said second storage device are the same storage device.

20. The computer system of claim 19, wherein said processing unit is for providing at least one notification to said first customer indicating that electronic access to said first document has been provided.

21. The computer system of claim 18, wherein said processing unit is for determining if said first customer has accessed said first document.

22. The computer system of claim 21, wherein said processing unit is for providing, if said first customer has not accessed said first document, one or more indications to said first customer that said first document has not been accessed.

23. The computer system of claim 21, wherein said first document contains one or more data links.

24. The computer system of claim 23, wherein said data links provide said first customer with transaction information.

25. The computer system of claim 21, wherein said processing unit is for displaying said first document upon a website in image type format or non-image type format.

26. The computer system of claim 25, wherein said processing unit is for creating one or more summaries of said first document, and displaying one or more of said summaries upon said website.

* * * * *

UNITED STATES PATENT AND TRADEMARK OFFICE
CERTIFICATE OF CORRECTION

| | | |
|---|---|---|
| PATENT NO. | : 6,877,136 B2 | Page 1 of 1 |
| APPLICATION NO. | : 10/280764 | |
| DATED | : April 5, 2005 | |
| INVENTOR(S) | : Dwayne Lamarr Bess et al. | |

It is certified that error appears in the above-identified patent and that said Letters Patent is hereby corrected as shown below:

Title page, item [75] inventors: add "Doug Maxwell, San Clemente, CA (US);

Signed and Sealed this

Third Day of June, 2014

Michelle K. Lee
*Deputy Director of the United States Patent and Trademark Office*